(12) United States Patent
Anderberg

(10) Patent No.: US 7,069,612 B1
(45) Date of Patent: *Jul. 4, 2006

(54) CONNECTING DEVICE AND METHOD OF CONNECTION

(75) Inventor: Nils-Eric Anderberg, Trelleborg (SE)

(73) Assignee: FMT International Trade AB, Trelleborg (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,747

(22) PCT Filed: Sep. 14, 1995

(86) PCT No.: PCT/SE95/01034

§ 371 (c)(1),
(2), (4) Date: Mar. 14, 1997

(87) PCT Pub. No.: WO96/08411

PCT Pub. Date: Mar. 21, 1996

(30) Foreign Application Priority Data

Sep. 14, 1994 (SE) .............................. 9403058

(51) Int. Cl.
*E01D 1/00* (2006.01)

(52) U.S. Cl. ........................................ 14/71.5; 14/72.5
(58) Field of Classification Search ................. 14/69.5, 14/71.5, 72.5
See application file for complete search history.

(56) References Cited

U.S. PATENT DOCUMENTS

| 3,683,440 | A | | 8/1972 | Xenakis et al. | |
|---|---|---|---|---|---|
| 4,834,531 | A | | 5/1989 | Ward | 356/5 |
| 5,109,345 | A | | 4/1992 | Dabney et al. | 364/459 |
| 5,226,204 | A | * | 7/1993 | Schoenberger et al. | 14/71.5 |
| 5,257,431 | A | * | 11/1993 | Larson et al. | 14/71.5 |

FOREIGN PATENT DOCUMENTS

FR    2573724    2/1984

* cited by examiner

*Primary Examiner*—Thomas B. Will
*Assistant Examiner*—Alexandra K. Pechhold
(74) *Attorney, Agent, or Firm*—Orum & Roth LLC

(57) ABSTRACT

One end of a passenger bridge or a goods-handling device of mobile type can be expediently and securely connected to a door on a craft, especially an aircraft, by determining the position of the door in relation to a reference point on the craft and storing it in a computer system. Furthermore, the absolute position of the door when the craft has come to a halt and the passenger bridge or the goods-handling device is to be connected, is determined by measuring the distance from a reference point on the ground to the craft. Finally, the computer system guides the passenger bridge to the door of the craft, the position of the end of the passenger bridge or the goods-handling device being determined during the guiding operation and inputted into the computer system. To further shorten the connection time, the passenger bridge or the goods-handling device is advantageously guided to an initial position of connection in the vicinity of the craft, in which position the end of the passenger bridge or the goods-handling device is aligned with the expected position of the door and disposed at a small distance therefrom, before the craft has come to a halt.

17 Claims, 3 Drawing Sheets

CONNECTING DEVICE AND METHOD OF CONNECTION

BACKGROUND OF THE INVENTION

1. Field of the Invention

Figure 1:
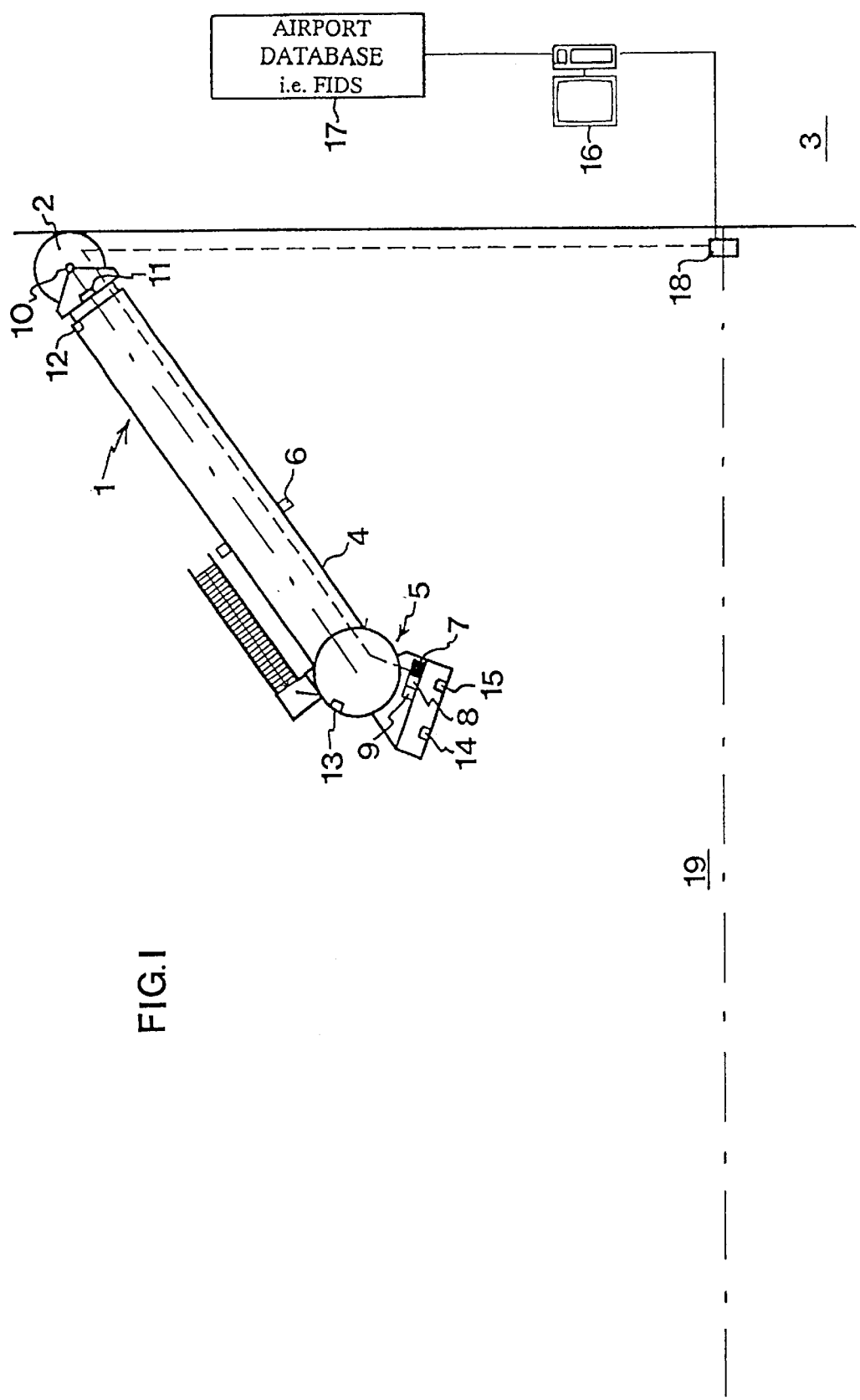

This invention relates to a connecting device and a method of connecting one end of a passenger bridge or a goods-handling device of mobile type to a door on a craft, in particular an aircraft.

2. Discussion of the Prior Art

A known mobile-type passenger bridge going under the name of Apron Drive comprises a rotunda that is connected to a terminal building and is rotatably mounted on a column anchored in the ground. From the rotunda extends a passageway, which is made up of a number of telescoping elements, enabling variation of the length of the passageway. At the end of the passageway located farthest away from the rotunda, there is provided a cabin which is pivotable in relation to the passageway. The passageway element to which the cabin is attached is suspended from a vertically adjustable frame, which in turn is supported by a bogie with wheels that can be driven separately.

The passenger bridge normally occupies a parking position in the vicinity of the place where the aircraft is to come to a halt after landing. When the aircraft has come to a halt, an operator controls the passenger bridge vertically and angularly, pivots the cabin and telescopically extends the passageway in the direction of the aircraft, such that the end of the bridge is connected to the door of the aircraft. The operation in the horizontal plane is achieved by altering the speeds of the bogie wheels in relation to one another.

Owing to its complexity, this operation requires operators with special training, which of course is expensive for the airlines. Furthermore, it takes a long time to perform the connection. Also, it happens that the bridges bump into the aircraft as a result of mismanoeuvering on the part of the operator, thus damaging the aircraft.

SUMMARY OF THE INVENTION

The object of this invention is, therefore, to solve the problems described above.

According to the invention, this object is achieved by a method as claimed in appended claim 1 and a device as claimed in appended claim 8.

To be more specific, the solution to these problems consists in determining the position of the door of the aircraft with respect to a reference point on the aircraft, and storing in a computer system information related to the position of the door. Furthermore, the position of the aircraft when this has come to a halt and the passenger bridge is to be connected is determined, and information related to the position of the aircraft is inputted into the computer system. As a result, the computer system may determine the absolute position of the door when the aircraft has come to a halt. Finally, the passenger bridge is automatically guided to the door on the basis of the information found in the computer system. During this guiding operation, the position of the end of the passenger bridge is determined and inputted into the computer system, such that the computer system will know where the passenger bridge is located.

Thus, this connection of the passenger bridge does not require any operator at all. Since the computer system controlling the passenger bridge knows the exact position of both the door and the end of the passenger bridge and since there is thus no need of any assessment by eye, the computer system is able to perform the connection much more expediently and accurately than could a human operator, there being in addition no risk of any damage caused to the aircraft.

Moreover, this method of connection of the passenger bridge is advantageous in that it enables the use of the well-tried systems already arranged in many airports to determine the position of aircraft, such that no new measuring equipment need be installed to determine the position of the aircraft door.

Such a per-se known system for determining the position of an aircraft is based on the measurement of the distance from a reference point to at least one point on the aircraft with the aid of electromagnetic waves.

The time it takes to connect the passenger bridge can be further shortened by guiding, even before the aircraft has come to a halt, the passenger bridge to an initial position of connection, where only minimum operation of the passenger bridge is required to connect it to the door of the aircraft, but which nevertheless is so located that there is no risk of the aircraft running into the passenger bridge. If the expected position of the aircraft when this will have come to a halt is stored in the computer system, the expected position of the door when the aircraft will have come to a halt can then be calculated. The passenger bridge can then be so aligned with the expected position of the door that the end of the bridge need only be telescopically extended a small distance in the direction of the door, provided that the aircraft really does come to a halt in the expected position.

To enable the connecting operation according to the invention to be performed with many different models of aircraft, or optionally for several doors of one and the same aircraft, each door position is stored in the computer system along with the identity of the aircraft, for instance the designation of the model.

In order to obviate the risk of an aircraft being damaged as a result of the computer system using the door position of another aircraft model than the one actually approaching the stand where a passenger bridge is to be connected, the identity of the aircraft is checked, for instance when the position of the aircraft is determined.

Accordingly, the invention is applicable to the connection of passenger bridges to aircraft. However, the invention is also applicable to the connection of "bridges" for the handling of goods. Furthermore, the invention is applicable to other craft than aircraft, such as ships.

DETAILED DESCRIPTION OF THE DRAWINGS

Figure 2:
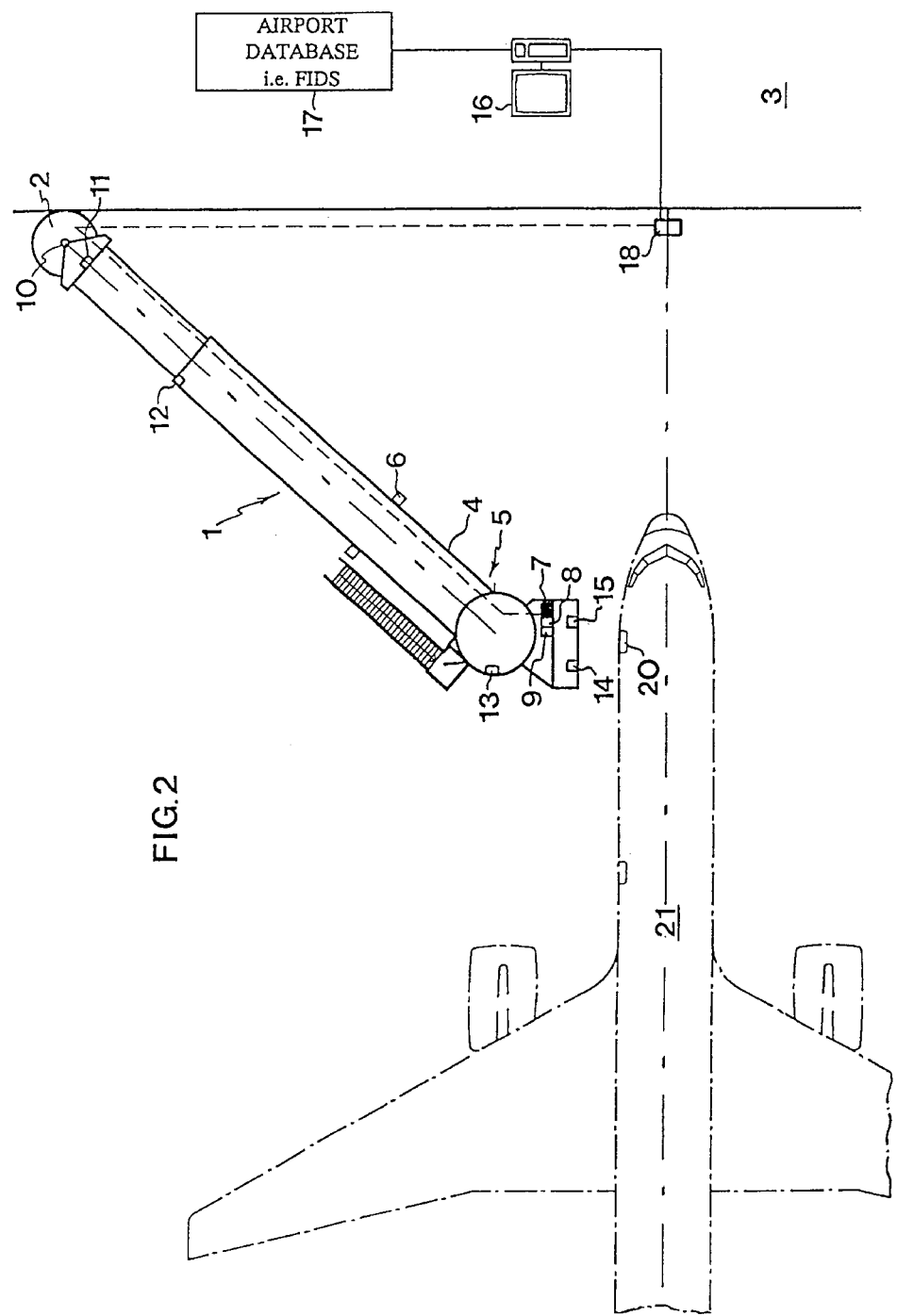
Figure 3:
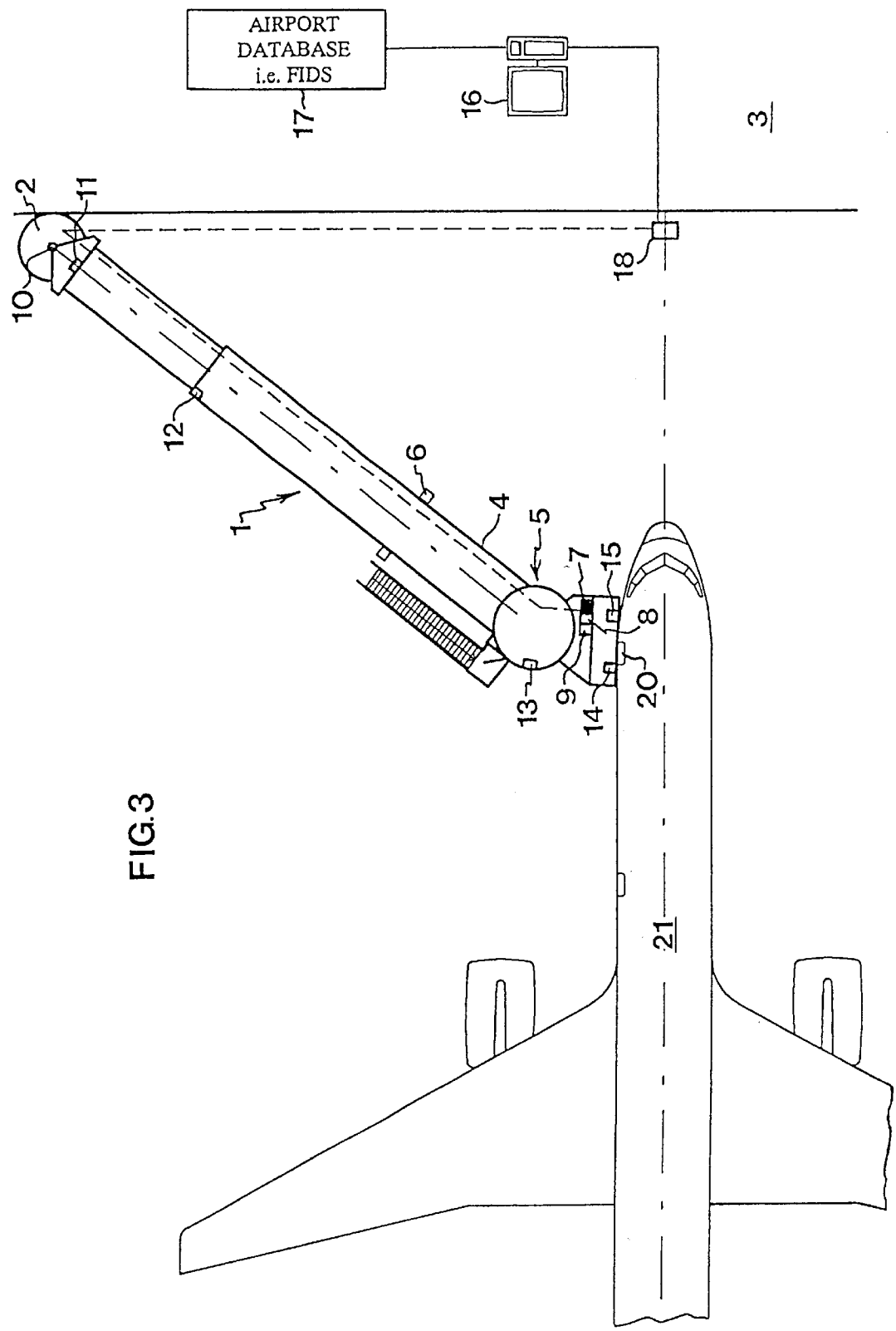

An embodiment of the invention will now be described with reference to the accompanying drawings, in which FIG. 1 is a schematic top view of a passenger bridge which is known per se but is equipped with a device according to the invention and which occupies a parking position;

FIG. 2 is a schematic top view showing the passenger bridge in FIG. 1 in an initial position of connection; and FIG. 3 is a schematic view showing the passenger bridge in FIGS. 1 and 2 when having been connected to the door of an aircraft.

DETAILED DESCRIPTION OF THE PREFERRED EMBODIMENT

The following example illustrates how the invention is applied to a prior-art passenger bridge of the type Apron Drive described in the introduction to this specification.

Thus, the passenger bridge 1 shown in FIG. 1 comprises a rotunda 2, which is connected to a terminal building 3 and from which extends a passageway 4. This passageway 4, whose length can be varied by telescoping, ends with a pivotable cabin 5.

As mentioned by way of introduction, the passenger bridge can be guided to different positions to be connected to an aircraft. To this end, the passenger bridge 1 comprises a bogie with driving wheels that can be acted upon with a view to achieving angular displacement of the passenger bridge as well as telescoping of the passageway elements to alter the length of the passenger bridge. Furthermore, the passageway 4 is suspended from a frame 6, which can be used for adjusting the height of the passenger bridge 1. Finally, the passenger bridge has means which can be acted upon with a view to pivoting the cabin 5.

The passenger bridge shown in FIG. 1 is provided with a device for automatic connection thereof to an aircraft. This device comprises a local passenger-bridge computer 7 having a control panel 8 arranged in the cabin 5. The local computer 7 is connected to, and adapted to act upon, the means for positioning the passenger bridge, to be more specific the means for adjusting the height of the passenger bridge, for adjusting the length of the passenger bridge by telescoping of the passageway elements, for pivoting the cabin 5 and for angularly displacing the passenger bridge 1. The computer 7 further comprises a database 9, in which is stored, inter alia, information on the positions of the doors of all the aircraft models in connection with which the invention is to be used. Preferably, the door positions are stored as the coordinates of the door centres in relation to a predetermined reference point on the aircraft, for instance a point on the surface below or above the cockpit window. Information on the expected stop position of the different aircraft models is also stored in the database 9.

To enable the local computer 7 to determine the current position of the passenger bridge 1, this is equipped with position-determining means which, in the illustrated example, comprise an absolute-value transducer 10 arranged on the rotunda 2 to determine the angular position of the passageway, an absolute-value transducer 11 arranged on the rotunda 2 to measure the height of the passageway, a pulse generator 12 adapted to determine the relative positions of the passageway elements and, consequently, the length of the passageway, as well as a pulse generator 13 adapted to determine the angular position of the cabin 5. On the basis of the input signals obtained from these transducers 10–13, the local computer 7 is able to guide the passenger bridge to an optional position amongst the positions the bridge may occupy. The transducers are of the type retaining its information also if the current supply is interrupted.

It goes without saying that the position-determining means indicated above are but examples, and that other sorts of transducers, as well as another number of transducers, may also be used. For instance, a laser may be mounted on the roof of the cabin, as may at least two reflectors on different locations on the terminal building. By sweeping the laser, measuring the distance to the reflectors with the aid of the laser, and determining the angular position of the laser when directed towards the reflectors, the position of the cabin may be determined.

In order to achieve safe and reliable connection of the passenger bridge to the door of the aircraft, the passenger bridge is further provided with an electromagnetic distance meter 14, which is disposed on the pivotable cabin 5 and is adapted to measure the distance to the aircraft as well as the height of the aircraft above ground. On that part of the cabin 5 which is to come into contact with the body of the aircraft, there are further provided one or more pressure transducers 15, which are adapted to measure the pressure exerted by the passenger bridge 1 on the body of the aircraft.

The local computer 7 is connected to a central computer 16, which may serve a plurality of stands at the airport. In the database 17 of the central computer 16, there is stored information about which aircraft are to arrive at the different stands. Among other things, this information includes the time of arrival, the airline, the model, the flight number and the place of departure of each aircraft.

With a view to determining the position of the aircraft when this has come to a halt at the stand and the passenger bridge 1 is to be connected, an electromagnetic distance meter 18 is further arranged on the outside of the terminal building 3 and aligned with the aircraft-stand centre line. The distance meter 18 may, for instance, be of the type described in SE 463,486 and is connected to the local computer 7 via the central computer.

Here follows a description of how the passenger bridge 1 is connected to a door 20 on an aircraft 21 which comes to a halt and is parked at the stand 19 indicated in FIG. 1.

When an aircraft has landed, this fact is recorded in the central computer 16, which in turn notifies the local computer 7 in the passenger bridge 1 involved and transmits information on the type of aircraft and its registration number.

Upon receipt of this information, the local computer 7 activates the distance meter 18 and guides the passenger bridge 1 to an initial position of connection for the type of aircraft approaching the stand 19. The initial position of connection is determined on the basis of the expected position of the aircraft when this has come to halt at the stand 19, as well as the position of the door on the aircraft, such that the end of the passenger bridge that is to be connected to the aircraft will be aligned with the expected position of this door and be located at but a small distance therefrom in the initial position of connection.

When the initial position of connection has been determined, the local computer 7 first guides the passenger bridge 1 to a correct angular position with the aid of the signals obtained from the angle transducer 10.

On the basis of signals received from the pulse generator 12, the local computer 7 then telescopically extends the passageway elements, so as to give the passageway 4 the correct length.

Next, the local computer 7 adjusts the height of the passenger bridge by acting upon the frame 6, the output signals from the height transducer 11 being used for detecting when the end of the passenger bridge is on a level with the expected position of the door of the aircraft.

Finally, the local computer 7 pivots the cabin 5 with the aid of signals from the pulse generator 13, such that the end of the passenger bridge is located in a plane that is parallel to the plane of the expected position of the door, whereupon the local computer 7 informs the central computer 16 that the passenger bridge has been preset, i.e. that it occupies the initial position of the connection.

In FIG. 2, the passenger bridge is shown when occupying the initial position of connection, and the expected stop position of the aircraft 21 at the stand 19 is indicated by dash-dot lines.

With the aid of the distance meter 18, the local computer 7 monitors the arrival of the plane 21. The distance meter 18, which for instance may have a range of 100 m, scans at a high frequency a sector located in front of the terminal building, such that the position of the aircraft can be determined with a high resolution when the aircraft comes within the measuring range of the distance meter 18.

When the local computer 7 detects, with the aid of the signals obtained from the distance meter 18, that the aircraft 21 has come to a halt at the stand 19, it checks that the aircraft is of the type for which the initial position of connection has been preset. This check can be carried out by determining the height of the aircraft with the aid of the distance meter, and comparing this height with the type of aircraft that, according to the local computer 7, has arrived at the stand. If this check reveals that the real aircraft is of another type than the one indicated in the local computer, the connection is interrupted and an error signal is emitted.

Since the height of the aircraft above ground, and hence that of its door, may vary according to the freight of the aircraft, the local computer 7 checks the height of the aircraft with the aid of information obtained from the distance meter 18 and the distance meter 18 and, when need be, adjusts the height of the passenger bridge 1.

Furthermore, the local computer 7 checks that the aircraft 21 is correctly parked in depth, i.e. that the distance between the distance meter 18 and the aircraft is as expected. If this is not so, the computer 7 calculates a new angular position for the passenger bridge and displaces the bridge angularly until the angular transducer 10 indicates that the correct position has been attained.

As a rule, it is enough to adjust the vertical position and the angular position, but also the length of the passenger bridge as well as the position of the cabin may, of course, be adjusted when need be.

After these adjustments, if any, the end of the passenger bridge is aligned with the door opening of the aircraft. The computer 7 then guides the passenger bridge in the direction of the aircraft by telescopic extension of the passageway elements. When the distance meter 14 indicates that the distance to the aircraft is smaller than a predetermined value, for instance 0.3 m, the speed of the passenger bridge is reduced. When the pressure transducer 15 detects that the passenger bridge has come into contact with the body of the aircraft, the computer stops the telescopic extension. The passenger bridge is now connected to the door of the aircraft, as illustrated in FIG. 3.

Furthermore, the pressure transducer 15 ensures that the pressure exerted by the passenger bridge on the body of the aircraft is not too high. When the transducer detects that this pressure exceeds a predetermined limit value, the computer 7 telescopes the passenger bridge a small distance away from the aircraft, thereby reducing the pressure.

When the passenger bridge is connected in conventional fashion, i.e. manually, the connecting operation takes approximately 3–5 min. With the method according to the invention, the connection can be carried out in 30 s.

Also the return of the passenger bridge to the parking position after the aircraft has left the stand is, of course, performed automatically with the aid of the local computer 7.

If so desired, one may arrange the programs of the local computer so that an airline representative should, for instance before the connection from the initial position of connection is begun, sanction, by pressing a key on the control panel 8 of the local computer, that there is no objection to the passenger bridge being connected to the aircraft.

Since the door positions of all types of aircraft are stored in the local computer of each passenger bridge, the passenger bridge can be connected automatically also when the central computer 16 is out of order, if only the current type of aircraft is inputted into the local computer 7, which can be done via the control panel 8.

What is claimed is:

1. A method of connecting one end of a passenger bridge or mobile goods-handling device to a door on a craft to be parked comprising the steps of:

determining an actual position of the craft when said craft has been parked, and inputting information related to the position of the parked craft into a computer system, wherein the step of determining the actual position of the parked craft comprises measuring a distance from a first reference point to at least a second reference point on the craft;

determining an actual position of the door of the parked craft on the basis of information, which has been previously stored in the computer system, about a relative position of the door of the craft with respect to the second reference point on the craft; and automatically guiding the passenger bridge or the goods-handling device to the determined actual position of the door a position of the end of the passenger bridge or the goods-handling device being determined during the guiding and inputted into the computer system.

2. The method as claimed in claim 1, comprising the additional steps of inputting into the computer system, before the craft is parked, information about an expected position of the parked craft, and automatically guiding, before the craft has been parked, the passenger bridge or the goods-handling device to an initial position of connection in a vicinity of the expected position.

3. The method as claimed in claim 2, comprising the additional step of determining an expected position of the door of the parked craft and wherein the step of automatically guiding the passenger bridge or goods-handling device to the initial position of connection comprises the alignment of the passenger bridge or the goods-handling device with the expected position of the door.

4. The method as claimed in claim 3, wherein the connection is monitored by detecting a pressure exerted on the craft by the passenger bridge or the goods-handling device.

5. The method as claimed in claim 2, wherein the identity of the craft is checked before making the connection.

6. The method as claimed in claim 1, wherein an identity of the craft is checked before guidance of the passenger bridge or goods-handling device to the determined position of the door of the craft.

7. The method as claimed in claim 6, wherein the connection is monitored by detecting a pressure exerted on the craft by the passenger bridge or the goods-handling device.

8. The method as claimed in claim 1, wherein the connection is monitored by detecting a pressure exerted on the craft by the passenger bridge or the goods-handling device.

9. The method as claimed in claim 1, wherein the craft is an aircraft.

10. The method as claimed in claim 1, wherein the distance measured in determining the actual position of the craft is determined with the aid of an electromagnetic wave measuring device.

11. A device for connecting one end of a passenger bridge or a mobile goods-handling device to a door on a parked craft, said passenger bridge or goods-handling device having positioning means for positioning said one end, comprising:

first position-determining means for determining a position of the passenger bridge or the goods-handling device;

second position-determining means for determining an actual position of the craft when parked, said second position-determining means comprising means for distance measurement with the aid of electromagnetic waves; and a computer system which comprises storage means adapted to store a relative position of the door of the craft with respect to a reference point on the craft and to which are connected the first and the second position-determining means, said computer system being adapted to automatically guide said positioning means with the said of said information obtained from the position-determining means and the storage means, the positioning means guided in a manner such that the end of the passenger bridge or the goods-handling device is connected to the door.

12. The device as claimed in claim 11, wherein the storage means is further adapted to store an expected position of the craft when parked, and an identity of the craft.

13. The device as claimed in claim 11, wherein the first position-determining means comprises a distance-measuring laser device.

14. The device as claimed in claim 11, wherein the craft is an aircraft and the passenger bridge has a first end portion, a passageway which is pivotable in relation to the first end portion, and a second end portion which is adapted to be connected to the aircraft and is pivotable in relation to the passageway, and wherein the first position-determining means comprises a first transducer for determining the angular position of the passageway in relation to the first end portion, a second transducer for determining the angular position of the second end portion in relation to the passageway, a third transducer for determining the height of the passenger bridge, and a fourth transducer for determining the length of the passageway.

15. The device as claimed in claim 11, wherein at least one pressure transducer is arranged at the end of the passenger bridge or the goods-handling device and is adapted to measure a pressure exerted on the aircraft by the passenger bridge or the goods-handling device.

16. The device as claimed in claim 11, wherein the second position-determining means is adapted to check the identity of the craft by interaction therewith.

17. A method of connecting one end of a passenger bridge or a mobile goods-handling device to a door on a parked craft, comprising the steps of:

automatically guiding, before the craft has been parked, the passenger bridge or the goods-handling device to an initial position of connection in a vicinity of an expected position of the parked craft, said expected position being stored in a computer system;

determining, when the craft has been parked, an actual position of the parked craft, and inputting information related to the determined actual position of the parked craft into the computer system;

determining an actual position of the door of the parked craft on the basis of information, which has been previously stored in the computer system, about a relative position of the door of the craft with respect to the second reference point on the craft; and automatically guiding the passenger bridge of the goods-handling device to the determined actual position of the door of the parked craft, a position of the end of the passenger bridge or the goods-handling device being determined during the guiding operation and inputted into the computer system.

* * * * *